United States Patent [19]

Szodfridt

[11] Patent Number: 4,558,607

[45] Date of Patent: Dec. 17, 1985

[54] GEAR-TYPE CHANGE-SPEED TRANSMISSION FOR MOTOR VEHICLES

[75] Inventor: Imre Szodfridt, Stuttgart, Fed. Rep. of Germany

[73] Assignee: Dr. Ing. h.c.F. Porsche A.G., Stuttgart, Fed. Rep. of Germany

[21] Appl. No.: 554,806

[22] Filed: Nov. 23, 1983

[30] Foreign Application Priority Data

Nov. 27, 1982 [DE] Fed. Rep. of Germany ....... 3244042

[51] Int. Cl.$^4$ .............................................. F16H 3/38
[52] U.S. Cl. ...................................... 74/339; 74/377; 74/354
[58] Field of Search ................ 74/339, 340, 347, 361, 74/377, 473 R, 354; 200/61.91; 340/52 R

[56] References Cited

U.S. PATENT DOCUMENTS

| | | | |
|---|---|---|---|
| 3,545,295 | 12/1970 | Ravello | 74/339 |
| 4,016,773 | 4/1977 | Galas et al. | 74/339 X |
| 4,263,815 | 4/1981 | Ashauer | 74/339 |

FOREIGN PATENT DOCUMENTS

| | | | |
|---|---|---|---|
| 353714 | 10/1937 | Italy | 74/340 |
| 473602 | 8/1952 | Italy | 74/340 |

*Primary Examiner*—Leslie A. Braun
*Assistant Examiner*—Joseph M. Rolnicki
*Attorney, Agent, or Firm*—Craig & Burns

[57] ABSTRACT

In a gear-type change-speed transmission with synchronized reverse speed, the corresponding pair of gears consists of a loose gear which is adapted to be clutched with the driving shaft and of a fixed gear of the output shaft; an intermediate gear is adapted to be engaged between the loose gear and the fixed gear by means of a pivot lever; the intermediate gear meshes constantly with the loose gear, is brought in a first shifting phase into engagement with the fixed gear over a small partial area of its tooth width load-free and during the further engagement of the reverse speed is engaged into the fixed gear over its full tooth width. Only thereafter the loose gear is coupled torque-transmittingly with the input shaft.

15 Claims, 3 Drawing Figures

GEAR-TYPE CHANGE-SPEED TRANSMISSION FOR MOTOR VEHICLES

The present invention relates to a gear-type change-speed transmission for motor vehicles with an input shaft and an output shaft that are supported parallel to one another in the transmission housing and several pairs of gears in meshing engagement with each other for the engagement of a corresponding number of forward speeds as well as a pair of gears for the engagement of the reverse speed.

A gear-type change-speed transmission with synchronized reverse speed is known from the German Auslegeschrift No. 11 86 750. In this transmission, the input shaft and the output shaft are supported coaxially to one another in the transmission housing. A reversing gear arranged on an intermediate shaft for the reverse speed meshes with a gear of a countershaft which is in constant engagement with the gear loosely supported on the output shaft and adapted to be coupled with the output shaft by way of a synchronizing clutch. During the synchronization, it is moved into a gear which is mounted on the shifting sleeve non-rotatable with the output shaft.

With these gear-type change-speed transmission, the loose gear rotates on the output shaft opposite the output shaft, from which result relatively high rotational bearing speeds; for shifting additional synchronizing masses have to be accelerated. It results in a relatively large space requirement and the overall construction is quite costly in its manufacture.

A spatially favorable construction can be achieved if the input shaft and the output shaft are supported in parallel within the housing. The object of the present invention resides in providing for such a transmission arrangement a shifting mechanism of the reverse speed with small space requirements, whose actuation causes only low mass forces and thus enables a shock-free and low-noise shifting of the reverse speed.

The underlying problems are solved according to the present invention by the following features. An intermediate gear for the motion transmission from the loose gear of an input shaft to the fixed gear of an output shaft is preferably constantly in engagement with the loose gear. The loose gear is adapted to be connected with the driving shaft by a clutch mechanism. In a first shifting phase, the intermediate gear is brought into engagement with the fixed gear over a small partial area of its tooth width. After a further engagement of the clutch device, the intermediate gear is in engagement with the loose gear and the fixed gear over its full width. Only thereafter, the clutch device is engaged completely in order to connect the loose gear with the driving shaft in a torque-transmitting matter. As a result of the slight engagement of the intermediate gear and fixed gear, the reverse speed-gears rotate synchronously load-free so that during the engagement of the clutch device no mass forces necessary for a wheel acceleration occur. As a result thereof, also with the use of a claw clutch which is preferred in particular for racing purposes, a far-reachingly shock-free and low-noise shifting of the reverse speed is assured. This is true above all if a double-clutch transmission shiftable as a function of load is used.

According to a further feature of the present invention, the shifting rod for the reverse speed and a forward speed is actuated hydraulically. The end positions of the shifting movements are secured by abutments.

These and other objects, features and advantages of the present invention will become more apparent from the following description when taken in conjunction with the accompanying drawing which shows, for purposes of illustration only, one embodiment in accordance with the present invention, and wherein.

Figure 1:
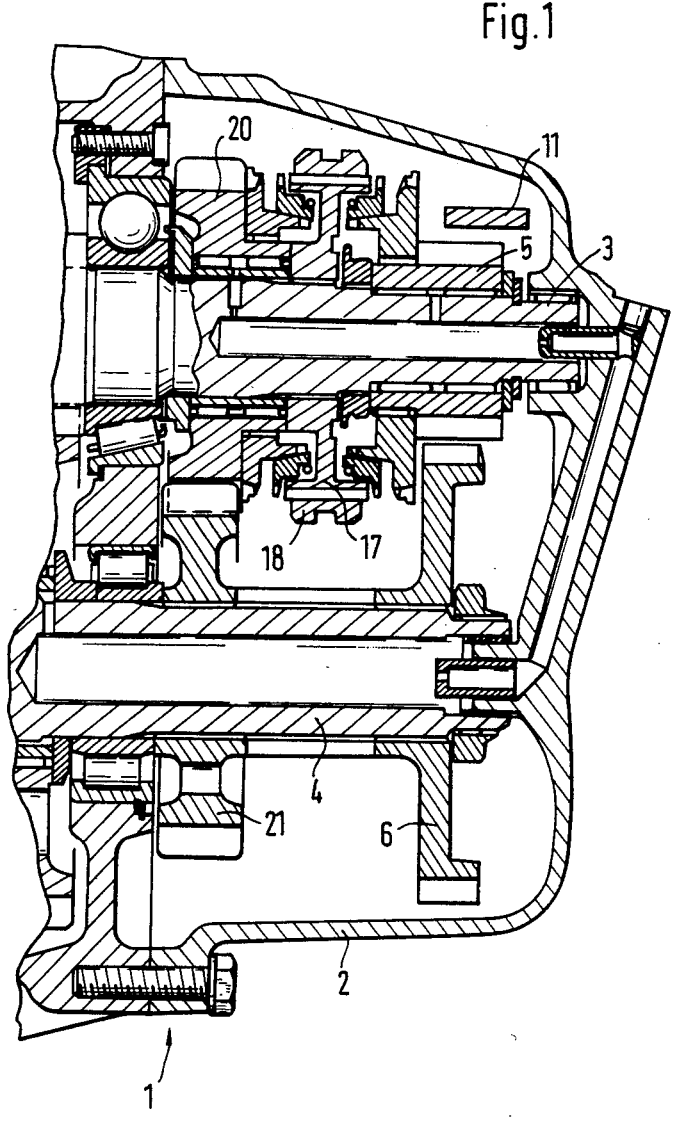
FIG. 1 is a longitudinal cross-sectional view through a gear-type change-speed transmission in accordance with the present invention within the area of the synchronized reverse speed thereof.

Referring now to the drawing wherein like reference numerals are used throughout the various views to designate like parts, an input or driving shaft 3 and parallel thereto an output shaft 4 are supported within a transmission housing generally designated by reference numeral 1 which is closed off by a bolted-on housing cover 2. For the engagement of the reverse speed, the driving shaft 3 carries a freely rotatable loose gear 5 while the output shaft 4 carries a fixed wheel 6 non-rotatable therewith; the loose gear 5 and the fixed gear 6 can be brought into engagement with one another by an intermediate gear 7. The intermediate gear 7 is longitudinally displaceable on a bolt 8 (FIG. 2) which is secured, on the one hand, in the housing cover 2 and on the other on a plate-like lug 9 threadably secured to the housing cover 2. One lever arm 11' of a pivot lever 11 engages in an annular groove 10 of the intermediate gear 7, whose other lever arm 11" abuts at its free end at the abutment surface 12 of a sleeve 13 which is centered and secured on a shifting rod 14. For the support of the pivot lever 11, a bolt 15 is provided in an eccentric bush 16 (FIG. 3) secured at the housing cover 2.

The loose gear 5 is adapted to be connected with the driving shaft 3 by means of a synchronizing clutch 17 (FIG. 1) such as a claw clutch, during the actuation of which the pivot lever 11 is taken along at the same time. During the displacement of the synchronizing clutch 17 in the opposite direction, the loose gear of the fifth speed gear set is connected with the driving or output shaft 3. Four further gear pairs and associated synchronizing clutches are connected between the driving shaft 3 and the output shaft 4 which are without significance for the present invention and, therefore, have been omitted in the drawing.

With a non-engaged reverse speed, the intermediate gear 7 is in meshing engagement only with the loose gear 5. If for engaging the reverse speed, the shifting sleeve 18 of the synchronizing clutch 17, which is non-rotatable with the driving shaft 3, is displaced toward the right in the direction toward the loose gear 5, the intermediate gear 7 is displaced toward the left by a corresponding amount and engages over a small part of its tooth width, over about 1 mm. with the fixed gear 6 of the output shaft 4. In this shifting position, the shifting group of the reverse speed therefore rotates load-free. The further the shifting sleeve 18 is moved toward the right, the further the intermediate gear 7 engages between the loose gear 5 and the fixed gear 6 until it is in meshing engagement over its full tooth width. Only now the synchronizing clutch 17 is completely engaged so that the loose gear 5 is connected torque-transmittingly with the driving shaft 3.

Figure 2:
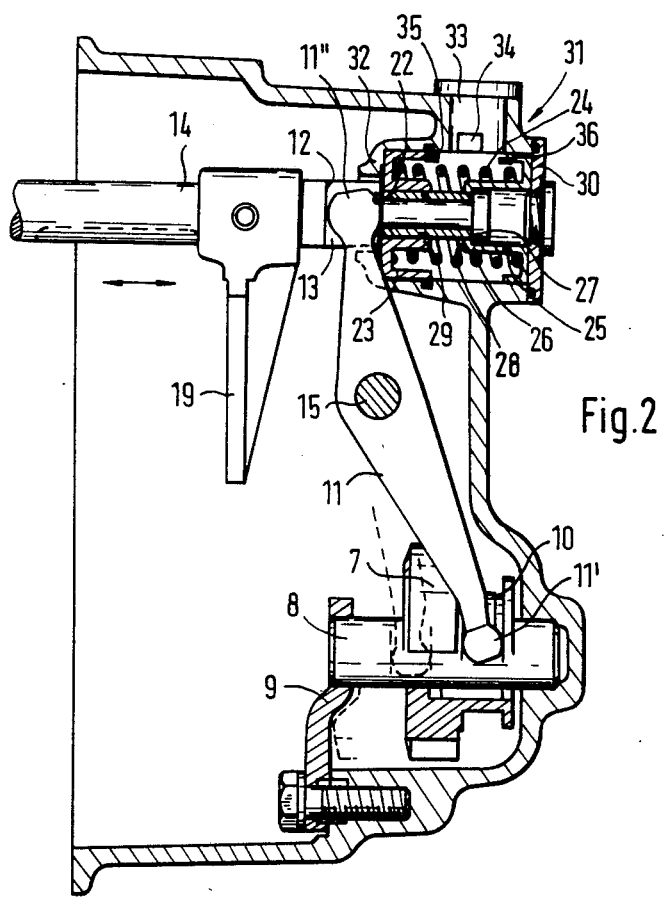
FIG. 2 is a partial cross-sectional view illustrating the shifting linkage with pivot lever and intermediate gear in accordance with the present invention.
Figure 3:
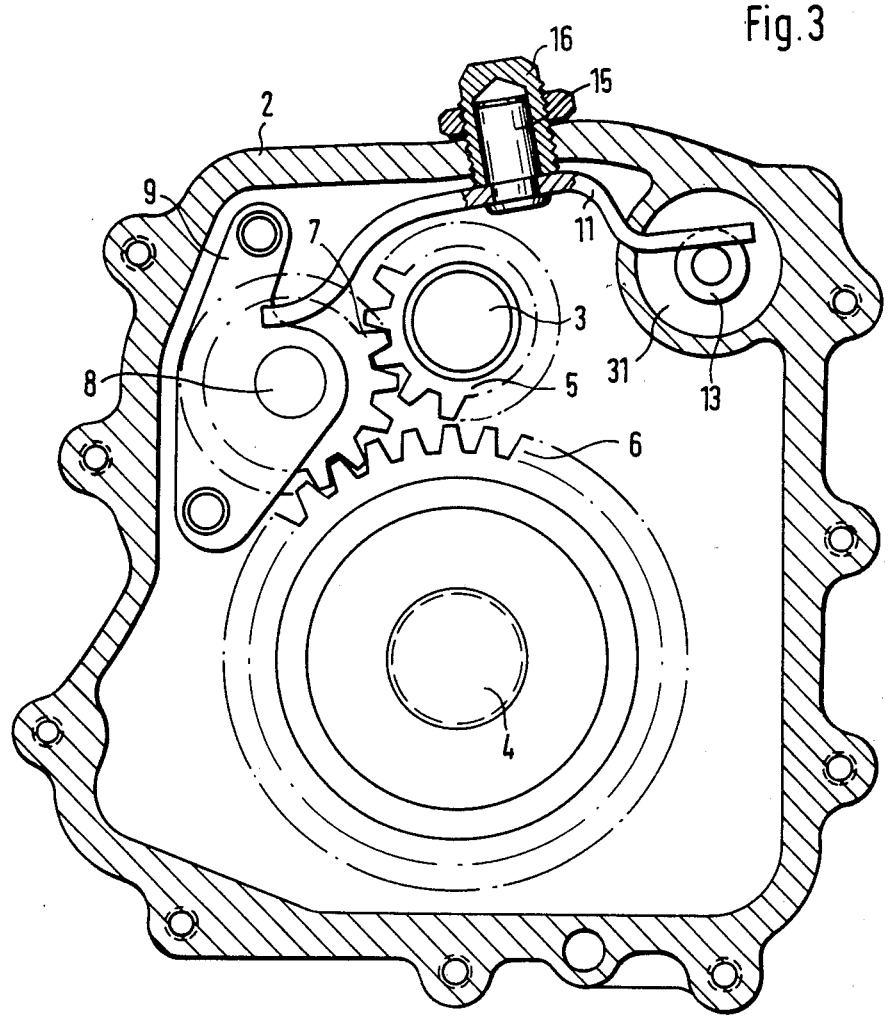
FIG. 3 is a cross-sectional view through the gear-type change-speed transmission within the area of the pair of reverse-speed gears.

A shifting fork 19 is secured at the shifting rod 14 which engages in the shifting sleeve 18 of the synchronizing clutch 17. If the shifting sleeve 18 is moved toward the left, then the gear pair 20, 21 of the fifth gear is engaged whereas if it is displaced toward the right, then the reverse speed is engaged in the manner described above. The longitudinal movements of the shifting rod 14 take place by hydraulic actuation and, as illustrated in FIG. 2, are secured in their end positions by abutments.

During the engagements of the reverse speed, the one arm 11'' of the pivot lever 11 abuts at a first abutment surface 12 which is milled into a sleeve 13 centered and fixed on the shifting rod 14. A spring sleeve 23 guided on the sleeve 13 is pressed against a second ring-shaped abutment surface 22 of the sleeve 13 by a spring 24 which is supported at a spring plate 25. The other flanged-over end 26 of the spring plate 25 is retained at a third abutment surface 27 which is provided directly at the shifting rod 14. It takes along during the engagement of the fifth speed, the spring plate 25 under prestressing of the spring 24 until the end face 28 of the spring plate 25 abuts at the end face 29 of the spring sleeve 23 facing the same; the pivot lever 11 thereby remains in the normal position. The shifting movement of the reverse speed is limited in that the end face 29 of the spring sleeve 23 comes into abutment at the end face 28 of the spring plate 25. The spring plate 25 is thereby stopped by the cover disk 30 of a spring housing generally designated by reference numeral 31 which is formed in an eye of the housing cover 2 that is bored out. The spring housing 31 accommodates the spring sleeve 23, the spring plate 25 as well as the spring 24 and is closed off at the one end face by the cover disk 30 and at the other end face by means of a cap 32. The shifting rod 14 and the sleeve 13 extend through a central bore of the cap 32.

In order to be able to indicate the position of the shifting rod 14, respectively, of the engaged speed or to be able to feed the same into a control apparatus, a measuring insert 33 is inserted into the spring housing 31 from above, which is equipped with a Hall transmitter 34. The Hall transmitter 34 is controlled during the engagement of the reverse speed by a magnet 35 secured at the spring sleeve 23 and during engagement of the fifth speed by a magnet 36 of the spring plate 25 and produces a corresponding signal to an indicating apparatus or a control apparatus of any known construction. For lubricating the moving parts and damping the shifting movements, the spring housing 31 may be filled with oil and sealed off appropriately with respect to the outside.

While I have shown and described only one embodiment in accordance with the present invention, it is understood that the same is not limited thereto but is susceptible of numerous changes and modifications as known to those skilled in the art, and I, therefore, do not wish to be limited to the details shown and described herein, but intend to cover all such changes and modifications as are encompassed by the scope of the appended claims.

I claim:

1. A gear-type change-speed transmission for motor vehicles, comprising an input shaft and an output shaft which are supported in parallel to one another within a transmission housing means, and several pairs of gears in meshing engagement with each other for the engagement of a corresponding number of forward speeds as well as a further pair of gears for the engagement of a reverse speed, characterized in that said further pair of gears consists of a loose gear freely rotatably supported on the input shaft and operable to be connected therewith by a clutch means and of a fixed gear of the output shaft non-rotatably connected therewith, and in that an intermediate gear is provided between the loose gear and the fixed gear, said intermediate gear being longitudinally displaceable by a pivot lever means and being in continuous meshing engagement with the loose gear in one end pivot position, said intermediate gear being operable to be brought into meshing engagement with the fixed gear over a partial area of its tooth width during initiation of the shifting movement of the reverse speed and during engagement of the clutch means is brought into engagement with the fixed gear over the full tooth width before the clutching operation is terminated and the loose gear is operatively connected with the input shaft in a torque-transmitting manner.

2. A change-speed transmission according to claim 1, characterized in that the clutch means is a synchronizing clutch.

3. A change-speed transmission according to claim 1, characterized in that a claw clutch is used as clutch means.

4. A change-speed transmission according to claim 1, characterized in that the intermediate gear is brought into meshing engagement with the fixed gear during initiation of the shifting movement of the reverse speed over the partial area of its tooth width of about 1 mm.

5. A change-speed transmission according to claim 1, further comprising a hydraulically actuated shifting rod, the reverse speed being engageable by the movement of said shifting rod in one longitudinal direction and a forward speed being engageable by movement thereof in the opposite direction, characterized in that during the engagement of a reverse speed, one arm of the pivot lever means abuts at a first abutment surface and in that a spring sleeve is held in abutment at a second abutment surface by a spring, said spring being supported at a spring plate coaxial to the spring sleeve, the other inwardly flanged-over end of said spring plate abutting at a third abutment surface of the shifting rod so that during the engagement of the forward speed, the spring plate is taken along under prestress of the spring.

6. A change-speed transmission according to claim 5, characterized in that the shifting movements of the shifting rod during the engagement of the reverse speed and of the forward speed are limited by alternate abutment of the spring sleeve at the spring plate.

7. A change-speed transmission according to claim 5, characterized in that a sleeve means is centered and fixed on the shifting rod, which contains the first and the second abutment surface, said spring sleeve and the spring plate being guided on said sleeve means.

8. A change-speed transmission according to claim 5, characterized in that the spring sleeve, the spring plate, and the spring are accommodated in a pipe-like closed spring housing formed in a housing cover of the transmission housing means.

9. A change-speed transmission according to claim 8, characterized in that the shifting rod extends through one end face of the spring housing and the spring sleeve is held in abutment by the spring whereas the spring plate is pressed against the other end face of the spring housing by the spring.

10. A change-speed transmission according to claim 9, characterized in that the spring housing is filled with oil for the lubrication of the moving parts and for the damping of the shifting movements and is sealed off with respect to the outside.

11. A change-speed transmission according to claim 9, characterized in that an electric position transmitter means for the shifting rod are provided in the spring housing.

12. A change-speed transmission according to claim 11, characterized in that the shifting movements of the shifting rod during the engagement of the reverse speed and of the forward speed are limited by alternate abutment of the spring sleeve at the spring plate.

13. A change-speed transmission according to claim 12, characterized in that a sleeve means is centered and fixed on the shifting rod, which contains the first and the second abutment surface, said spring sleeve and the spring plate being guided on said sleeve means.

14. A change-speed transmission according to claim 8, characterized in that the spring housing is filled with oil for the lubrication of the moving parts and for the damping of the shifting movements and is sealed off with respect to the outside.

15. A change-speed transmission according to claim 8, characterized in that an electric position transmitter means for the shifting rod are provided in the spring housing.

* * * * *